United States Patent [19]

Harold

[11] 3,853,347

[45] Dec. 10, 1974

[54] VEHICLE FOR CARRYING OTHER VEHICLES AND ITS TIE-DOWN SETUP

[75] Inventor: Billy E. Harold, Bethlehem, Pa.

[73] Assignee: Bethlehem Fabrications, Incorporated, Bethlehem, Pa.

[22] Filed: Aug. 3, 1972

[21] Appl. No.: 277,496

[52] U.S. Cl.......... 296/1 A, 280/179 A, 248/119 R, 105/368 T
[51] Int. Cl............................................ B62d 39/00
[58] Field of Search................. 296/1 A; 280/179 A; 248/119 R; 105/368 T

[56] References Cited
UNITED STATES PATENTS

| | | | |
|---|---|---|---|
| 1,841,066 | 1/1932 | Simning | 296/1 A |
| 2,094,407 | 9/1937 | Nampa | 105/368 T |
| 3,215,390 | 11/1965 | De Shetler | 248/119 R |
| 3,473,487 | 10/1969 | Blunden | 280/179 A |

Primary Examiner—Robert B. Reeves
Assistant Examiner—H. Grant Skaggs, Jr.
Attorney, Agent, or Firm—Jackson, Jackson & Chovanes

[57] ABSTRACT

In a car-carrier trailer for example, to tie down the cars being carried, longitudinally elongated holes are provided in series in the horizontal track setup for the cars riding on the trailer. An idler for the tie-down chain at a point between a ratchetted winch and the device for fastening to the car, has at its bottom an asymmetrical crosswise T-type hook. Above this preferably two interlinked rings providing pivoting around axes respectively horizontally perpendicular to the T-head of the hook and parallel to that T-head of the hook, have at their top as part of the member including the upper ring a flared opening directed crosswise of the T-head hook for the chain to pass through. The asymmetrical T-head hook is inserted through the longitudinal slot from above and turned at right angles and then the chain when tautened holds it in that position.

1 Claim, 21 Drawing Figures

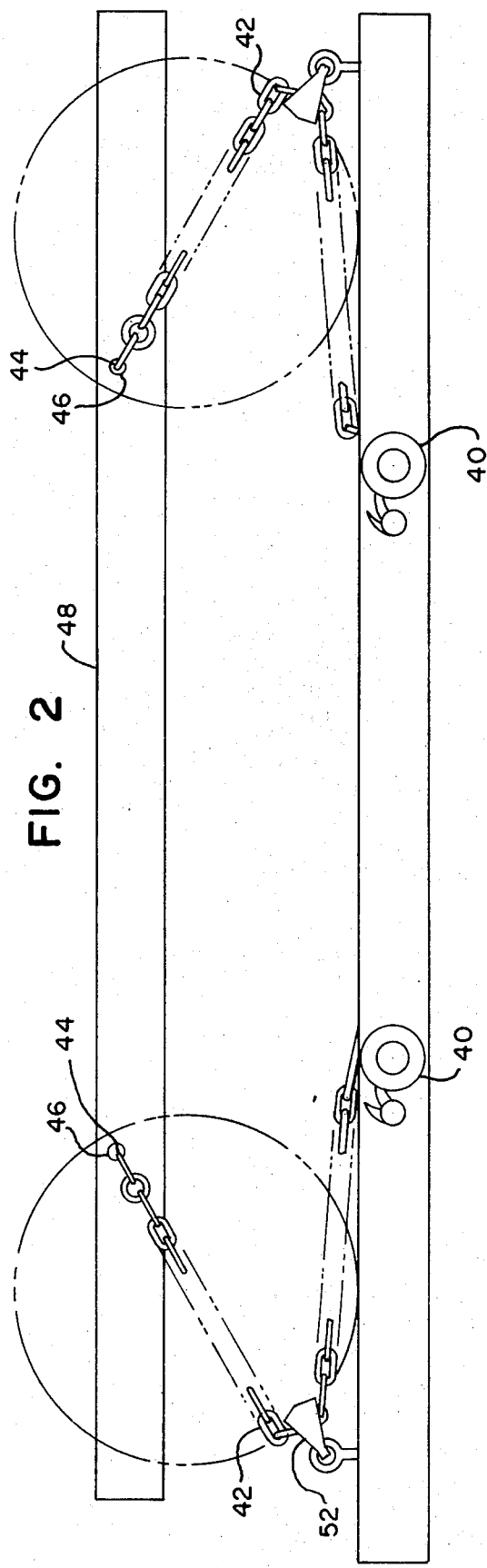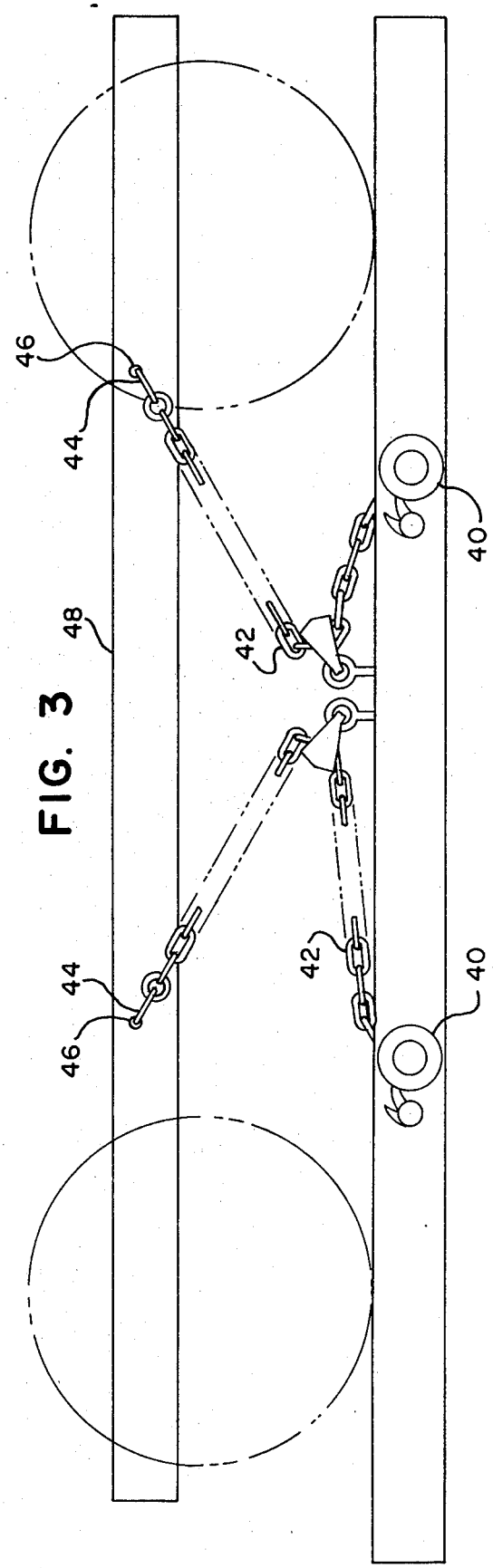

VEHICLE FOR CARRYING OTHER VEHICLES AND ITS TIE-DOWN SETUP

SUMMARY OF THE INVENTION

This invention relates to a vehicle for carrying other vehicles, including its tie-down setup.

A purpose of the invention is to provide such a vehicle for carrying other vehicles, as for example a car-carrying tractor-trailer truck, in which the vehicle being carried is tied down quite effectively and with utmost security, yet the overall arrangement involved is especially simple, economical, flexible and convenient.

A further purpose of the invention is to provide such a setup in which effective and desirable results are secured with very limited additional structure in the fixed structure of the main vehicle such as the tracks and associated structure of the vehicle.

A further purpose is to provide a setup as above in which the various structures used for the tie-down will in many cases be located in the tracks themselves when the tie-down is not in use, and yet there will be no interference with travel over these tracks by vehicles being loaded and unloaded.

A further purpose is to provide such a setup in which there will be convenient and secure storage of the apparatus for the tie-down when the main vehicle is being transported with the tie-down device not in use, as when it is traveling back to some point where the vehicles which it carries are being manufactured.

A further purpose is to provide such a setup where the chain or other flexible member used for securing the vehicle being carried, in itself has the effect of holding an idler in position free from danger of being pulled out once the chain is tautened.

Further purposes will be evident from the remainder of the specification and the claims.

BRIEF DESCRIPTION OF DRAWINGS

In the drawings I have shown a certain number only of the numerous embodiments in which the invention may appear, the form shown being chosen from the standpoints of convenience in illustration, satisfactory operation, and clear demonstration of the principles involved.

FIG. 2 is a diagrammatic view in elevation showing the overall tie-down setup tying down a particular vehicle, with the pull of the chain on the frame of the vehicle coming from a direction toward the ends of the vehicle, that is toward the front at the front tie-down point and toward the rear at the rear tie-down point.

FIG. 3 is a similar view showing the pull in each case coming from the center of the vehicle.

In FIG. 13 in the form of FIGS. 12 and 13, and FIG. 15 in the form of FIGS. 14 and 15, the longitudinal view has for illustrative purposes included a showing of the idler head in three different pivotal positions.

FURTHER DESCRIPTION

Figure 1:
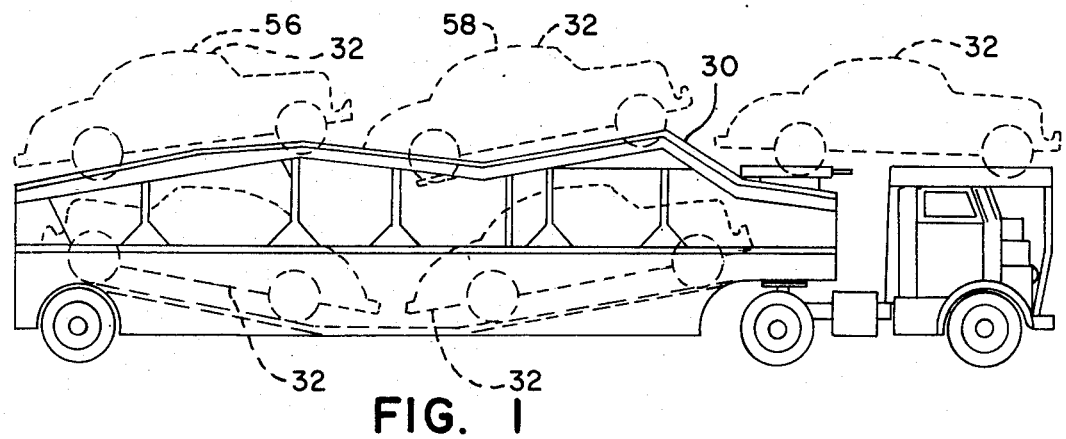
FIG. 1 is a view in side elevation showing an exemplary tractor-trailer of the invention of a comparatively simple and small type, simply to illustrate the sort of main vehicle and vehicles being carried which might be involved in this connection. The vehicles being carried are shown in phantom. Actually, normally the tractor-trailer would be a decidedly larger vehicle which would carry substantially more cars, such tractor-trailers, depending upon the particular problem at hand, being constructed to carry as many as nine cars for example.

As indicated the present invention involves vehicles for carrying other vehicles such as a car-carrying tractor-trailer truck, an example of which is shown at 30 in FIG. 1 with the cars shown in phantom at 32 for example. As already indicated, the particular example shown is a comparatively small such tractor-trailer truck, for purposes of simplicity of illustration, whereas more commonly at present the tractor-trailer trucks are larger and have a capability of carrying substantially more cars such as for example nine cars in an appropriate case.

One necessary part of such a car-carrying tractor-trailer or other such vehicle is of course some means to keep the vehicles being carried in place, this being normally done by some form of tie-down setup.

One form of such tie-down device which can be and is being used is one in which a cable or chain is mounted upon a rachetted winch, and has a fastening device at the end to fasten it to some suitable point on the car and intermediately the cable or chain passes through a device intended to fix the direction of pull for the part of the cable or chain nearest the fastener, as in the case of the vehicle tie-down structure found in Blunden, U.S. Pat. No. 3,473,487, which Blunden U.S. Pat. No. 3,473,487, together with hereinafter mentioned De Shetler U.S. Pat. No. 3,245,390, I hereby incorporate by reference herein. The winch can be used to pull the cable or chain up taut, and by means of four such devices, two on either side and each of the two pulling against the other in a more or less longitudinal direction, the vehicle being carried can be firmly tied down in a way to eliminate problems in the course of transporting it.

The present invention is an improvement in such vehicles involving an improvement in the overall tie-down structure designed to secure various of the advantages already mentioned in the summary of the invention in this application. Specifically, as shown for example in FIG. 2, the present invention in its overall tie-down structure includes ratchetted winch 40, this and the rest of the structure being present in each of the four particular tie-down apparatuses for each car. On that ratchetted winch is chain 42 extending to fastening member 44 cooperating with opening 46 in the frame 48 of the car, to tie down the car when the chain is in taut condition.

The fastening device 44 may take some form such as found in Blunden U.S. Pat. No. 3,473,487, or if desired the sort of thing involved in De Shetler U.S. Pat. No. 3,245,390, with its more elaborate fastening structure including a hook structure having a body portion and cross bar on the outside of the opening in the car structure and a larger C-shaped member extending through that opening with cross bar on its end and also an oppositely extending smaller C-shaped member inside the opening and also forming a part of the hook structure, which smaller C-shaped member extends from the heel of the large C.

Riding on the chain 42 at a point intermediate between winch 40 and securing device 44 is idler 52 held at its appropriate place in the frame of the main vehicle by securing structure 54 (see FIG. 4), when the tie-down set-up has been brought into taut condition by the winch. Ordinarily, as in the cases of particular cars 56 and 58, for example, and indeed most of the areas of trailer or tractor where cars are being carried in the normal tractor-trailer now in use, the securing structure will be as shown in FIG. 4.

Figure 4:
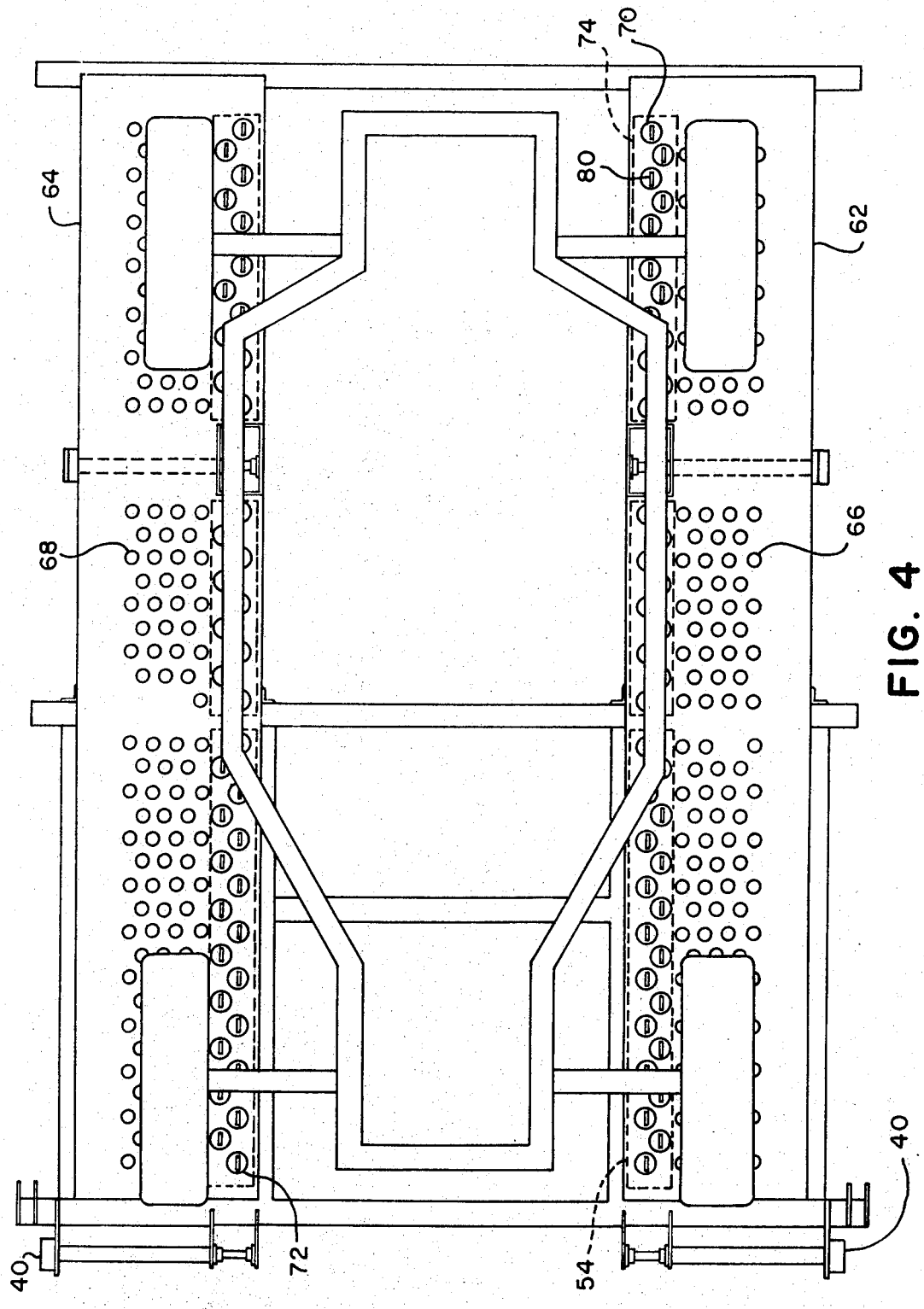
FIG. 4 is a diagrammatic plan view of a portion of the tracks of the main vehicle sufficient to hold a vehicle being carried, together with a diagrammatic representation of the frame and wheels, etc. of the vehicle being carried on top of the tracks.

More specifically, as shown in FIG. 4, tracks 62 and 64 have sets of holes 66 and 68 respectively with slightly raised wall portions (not shown) around their edges to aid the vehicles in getting sufficient friction to maintain position and move over the tracks when loading and unloading; and also along the inner portion of these tracks from a horizontal standpoint are a special series of holes 70 and 72, respectively. These latter holes are preferably of greater diameter than the holes for traction purposes and underneath the whole series in each case are longitudinally extending plates, the only one shown being the plate in the lower part of FIG. 4 denominated 74, but there being a corresponding plate under the corresponding holes 72 in the upper part of FIG. 4. These plates are secured in any suitable manner, as by welding along their entire longitudinal edges and at least a limited distance at the end corners along the end edges as well, or else along the whole ends. In these plates below each of the holes above it in the tracks, there is a longitudinal slot 80 extending at least most of the distance of the hole in the track, but considerably narrower than the hole above it in the track proper, which is round.

In special situations as will be gone into at a further point, especially at the front lower portion of the trailer for example, or at the rear lower portion of the trailer for example, special structure differing at least somewhat from that in FIG. 4 is provided.

Figure 5:
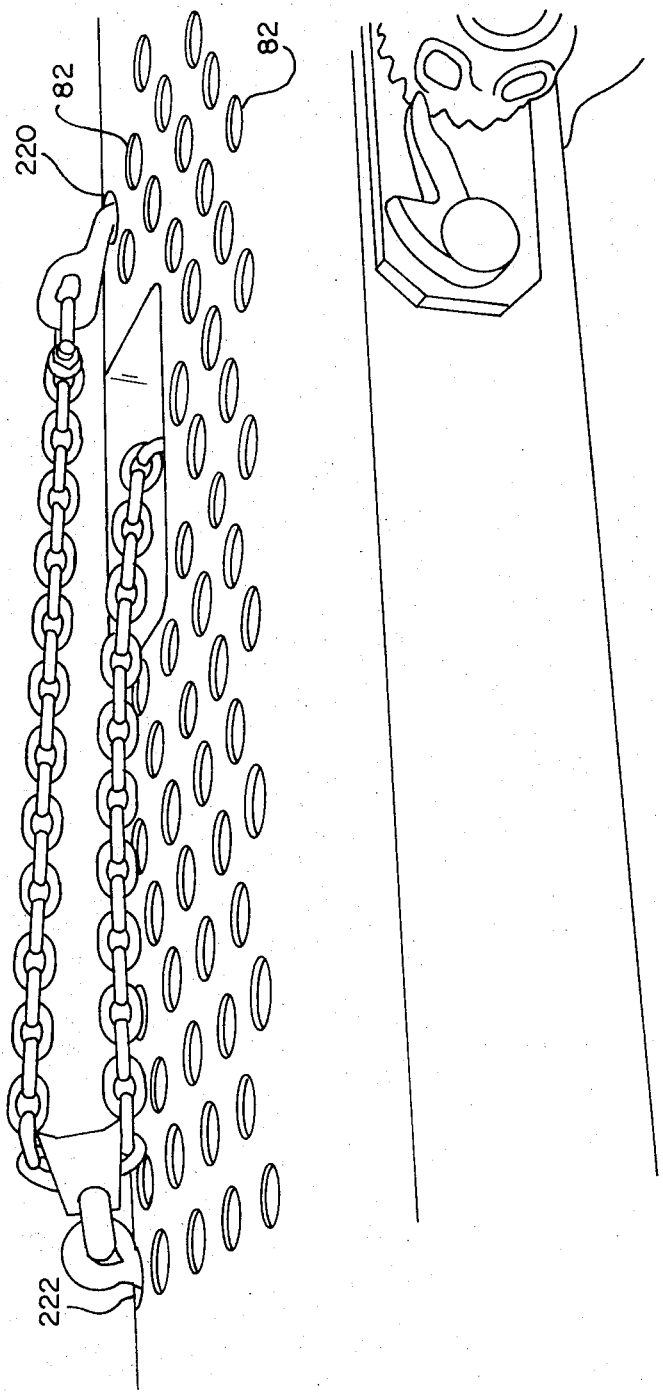
FIG. 5 is a diagrammatic perspective view showing a portion of a single track in the main vehicle in a slightly different form from that of FIG. 4, with the winch, chain, idler and securing device being shown in a case where the setup is in storage position.

If desired, all the holes in the horizontal surface of the track can be more or less the same single rather large size, as with holes 82 shown in FIG. 5, but the plate underneath along the inner portion, and its holes, will be as described, in this form also.

The idler 52 can take various particular forms. The preferred form is that found in FIGS. 6 and 7 or that in FIGS. 8 and 9.

Figure 6:
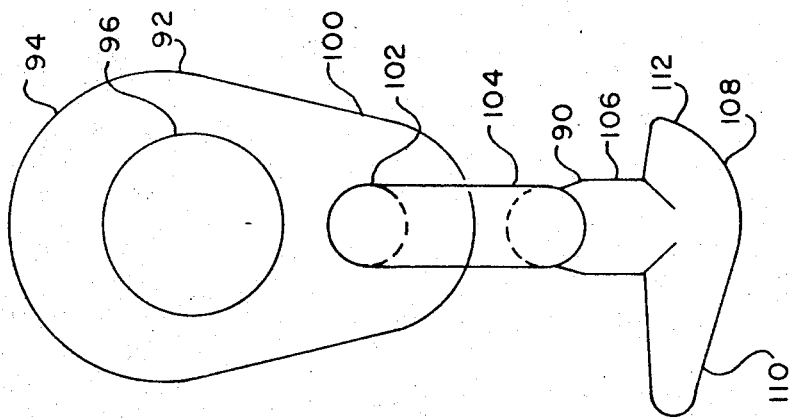
FIGS. 6 through 15 are a group of views showing various embodiments of the idler of the invention, each pair of views showing a different such embodiment, with the form of FIGS. 6 and 7 and of 8 and 9 respectively being the preferred forms. In each case, the even numbered of the pair of views is a side elevation, looking at the idler from a direction crosswise of the asymmetrical T hook, while the odd numbered view is an elevational view looking at the idler from a position at the end of the longer portion of the T hook in a direction longitudinal of the T hook.
Figure 7:
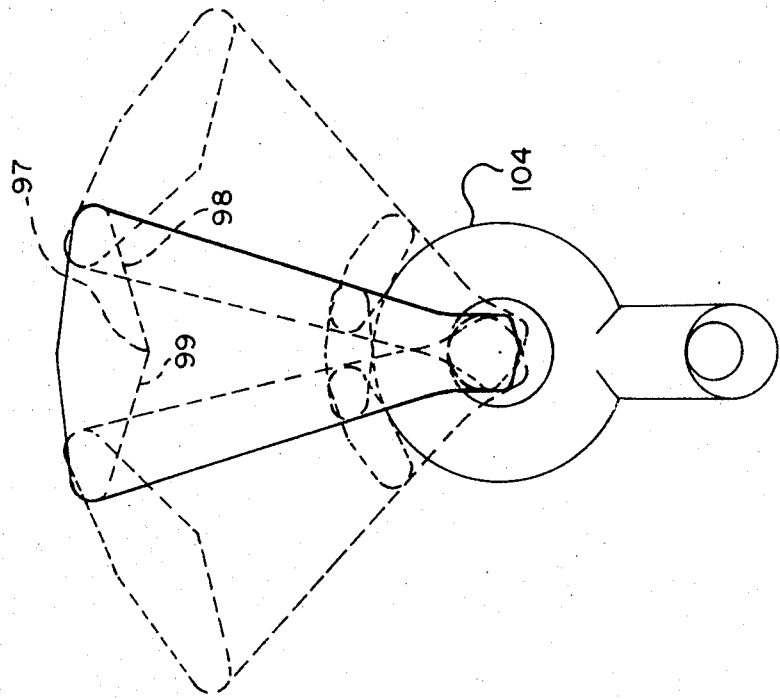

In this form, referring specifically to that of FIGS. 6 and 7, the idler has two separate portions: hook and shank portion 90, and upper portion 92.

Upper portion 92 has large ring 94 at the top, with large hole 96 having a relatively smaller diameter in the center at 97 and flaring toward the outside in each direction at 98 and 99, this hole being for passage of the chain 42, so that the idler will ride upon and hold the chain. In the lower part of this portion 92 is a smaller ring 100 with hole 102 parallel to the large hole 96, through which hole 102 passes ring 104, round in cross section forming the upper part of the hook and shank portion, this latter ring fitting loosely in hole 102.

Hook and shank portion 90, in addition to ring 104 at the top, includes shank 106 extending down from that ring, and asymmetrical T-hook 108, which includes longer projection 110 in one direction and shorter projection 112 in the opposite direction, with top more or less at right angles to the shank and in both cases crosswise of hole 96 in ring 94 of the upper portion of the idler. In contrast to the holes in the upper portion 92, the hole in ring 104 forming the top of hook and shank portion 90 is directed more or less parallel to the head of the asymmetrical T-hook 108.

Figure 8:
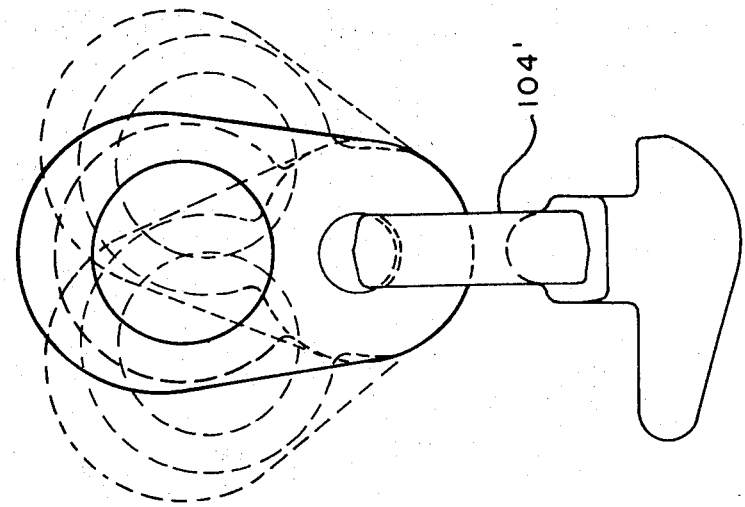
Figure 9:
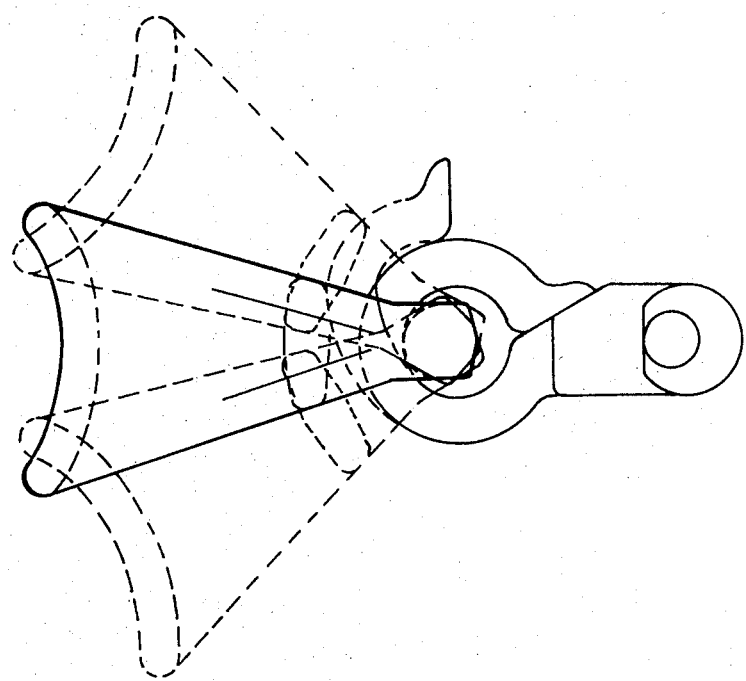

The forms of FIGS. 8 and 9 will be seen to follow a rather similar pattern, but with some variation in the specific details, as for example having ring 104' corresponding to ring 104 have a circular cross sectional surface only in the interior portion, and the flare in the large hole a gradually increasing flare rather than a constant funnel-type flare, etc.

Figure 11:
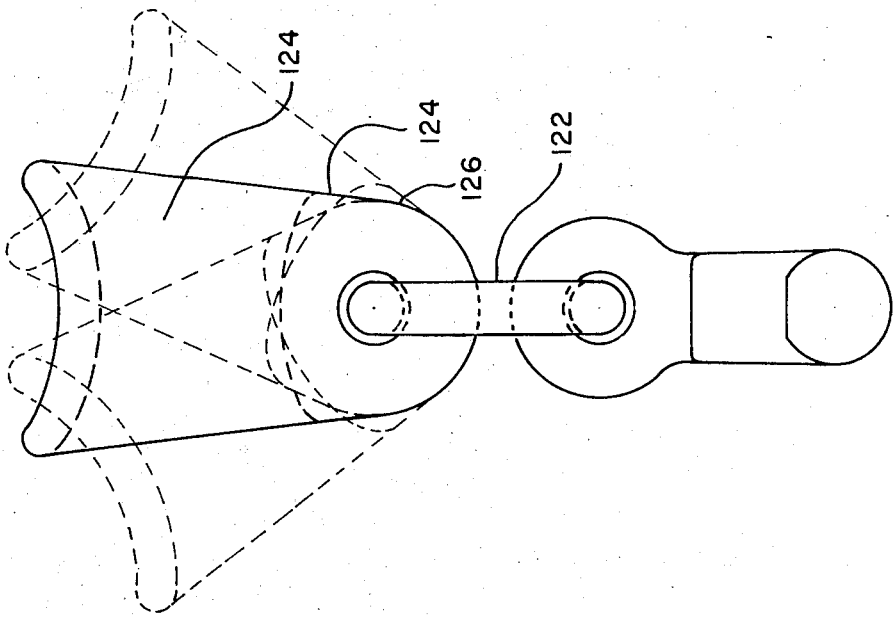
Figure 10:
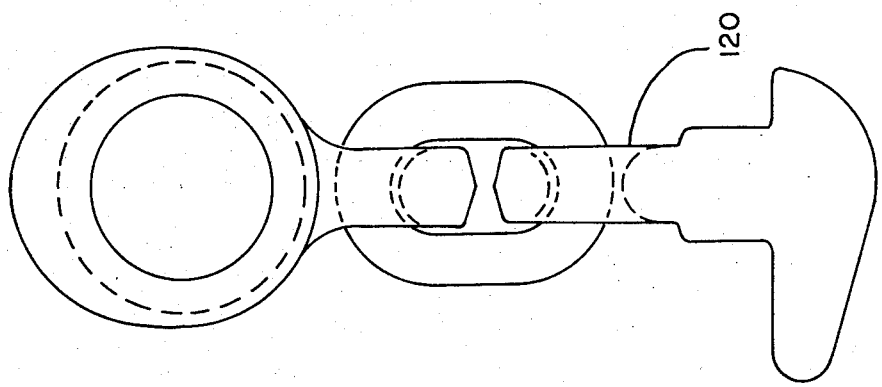

In the form of FIGS. 10 and 11, hook and shank portion 120 is functionally similar to hook and shank portion 90 in FIGS. 6 and 7 but fitting into it from above is link 122 and above that and fitting into link 122 is upper member 124 with its hole in lower ring member 126 at right angles rather than parallel to large flared hole 128 through which the chain passes.

Figure 12:
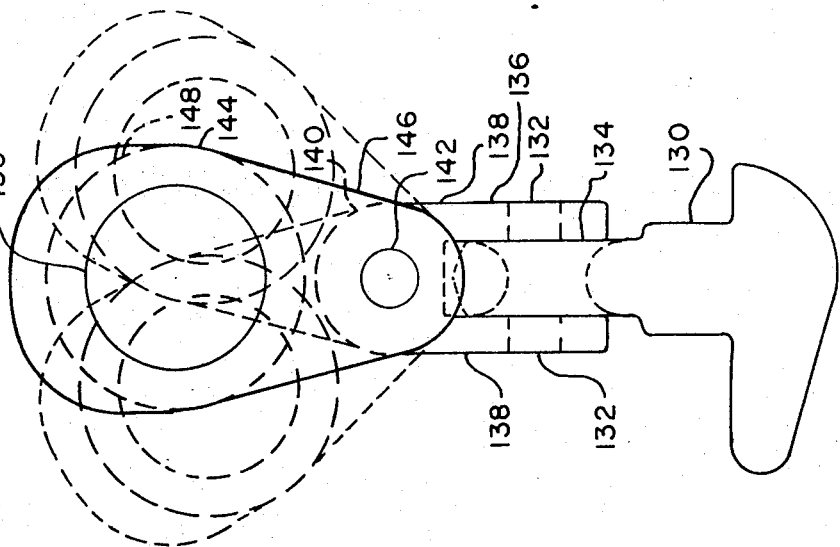
Figure 13:
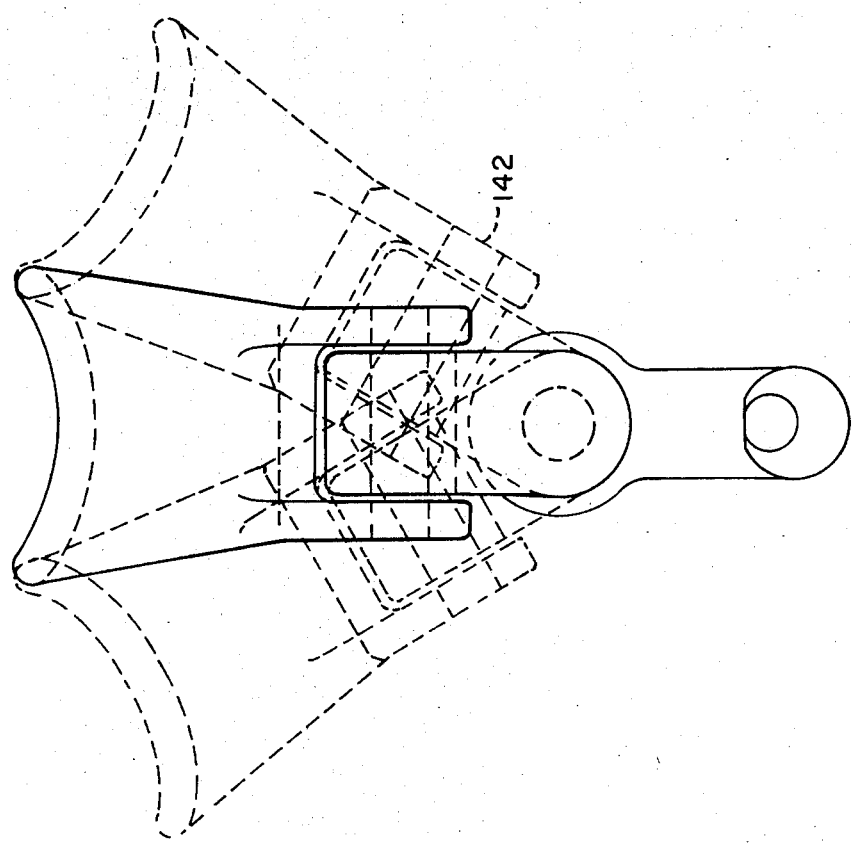

In the form of FIGS. 12 and 13, hook and shank member 130 has trunnions 132 extending out from the upper part of shank 134. Intermediate member 136 includes yoke 138 riding with pivoting capabilities on trunnions 132 and upper portion 140 with trunnions 142 at the sides. Upper member 144 includes yoke 146 riding pivotally on trunnions 142 and again a flared ring 148 at the top with a large flared hole 150 inside for the chain.

Figure 14:
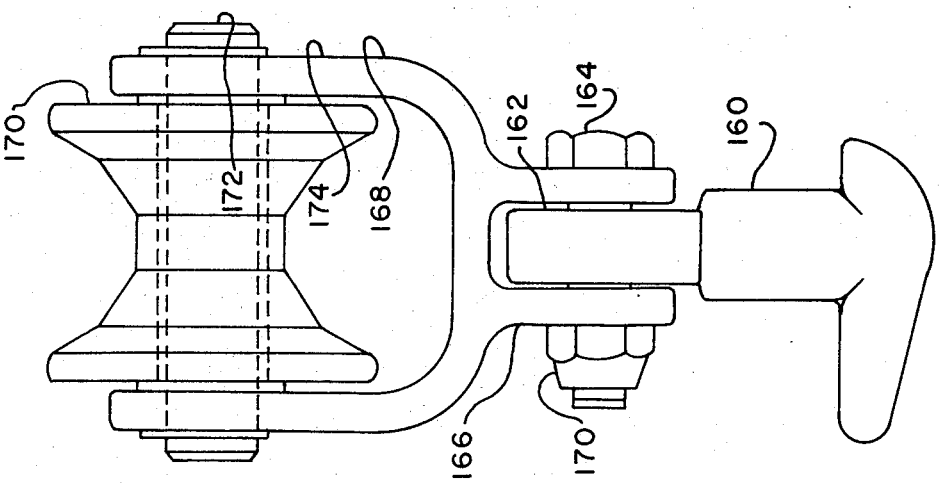
Figure 15:
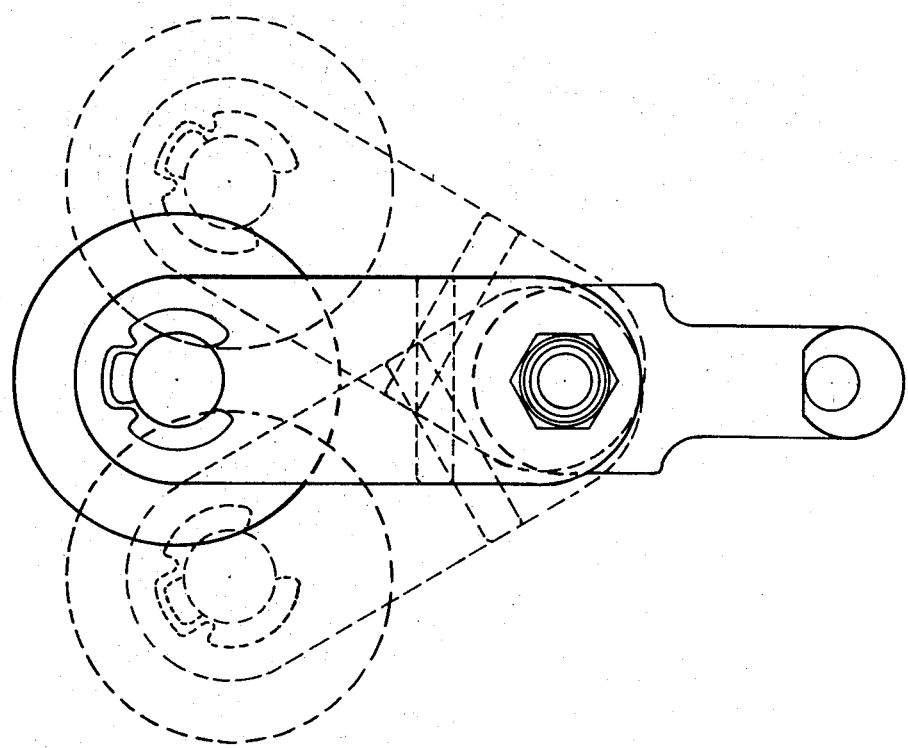

In the form of FIGS. 14 and 15, hook and shank member 160 includes a hole (not shown) through the interior of the upper part of shank 162, through which loosely passes bolt 164 secured to yoke 166 in upper member 168 by means of nut 170. Upper member 168 also includes in its upper portion pulley 170 mounted to rotate on its shaft 172, with room for the chain between the pulley and the upper yoke 174 forming part of this upper member, mounting shaft 172.

It will be noted that in all cases the asymmetrical T-hook is positioned with the T at right angles to the hole or pulley passage for the chain in the upper member, and the construction is such that this relationship cannot change. It will further be noted that in most of the forms, including the preferred forms, and also the forms of FIGS. 10 and 11 and 12 and 13 respectively, pivot means are provided for pivoting around horizontal axes in both the horizontal longitudinal direction and the horizontal crosswise direction or in other words around a horizontal axis crosswise of the T hook and around a horizontal axis parallel to the T hook.

FIGS. 16 through 19 show special structure in connection with the front end of the lower part of the trailer, in the form that is considered most desirable to use.

Figure 16:
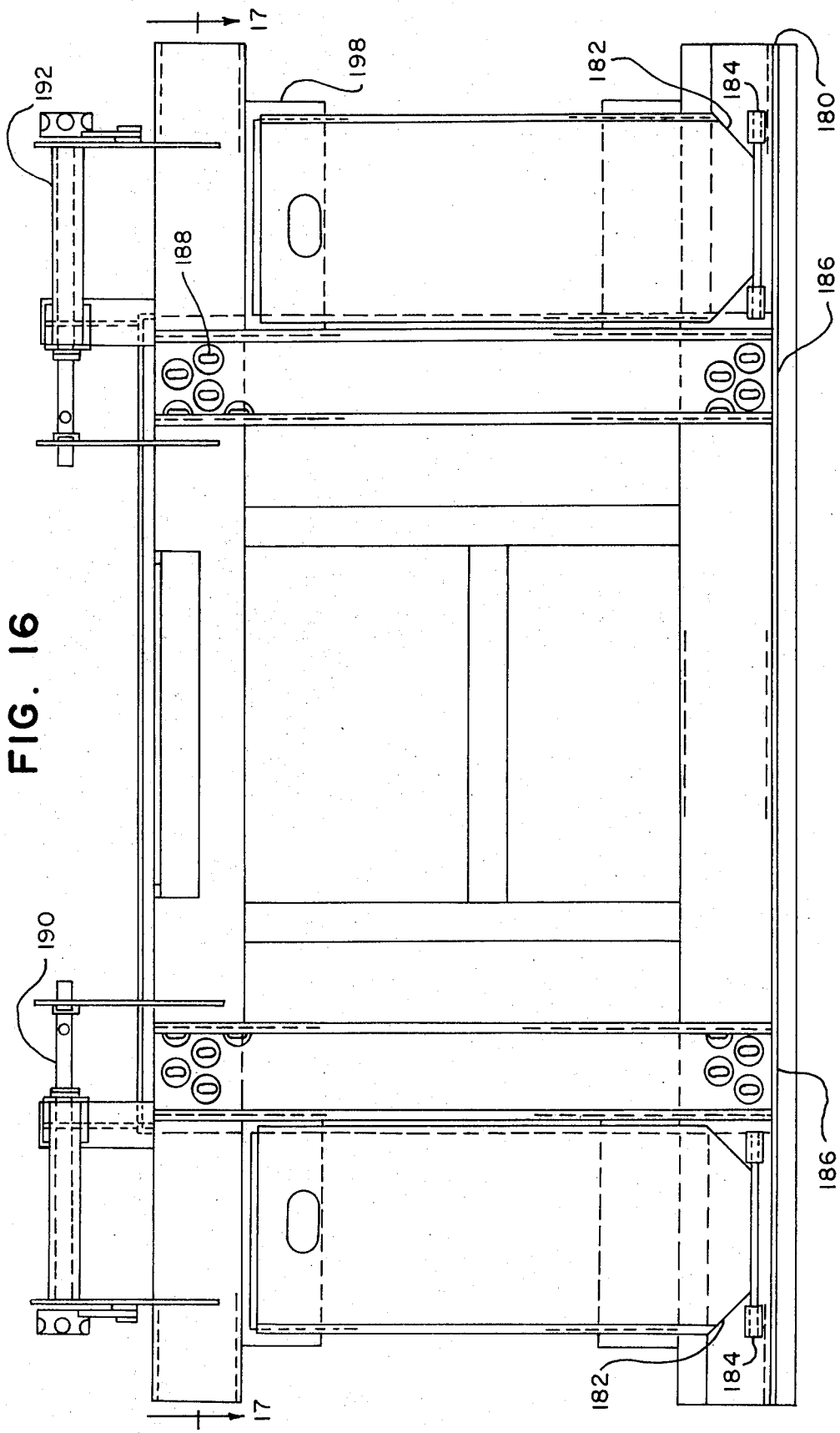
FIG. 16 is a plan view of special structure related to the track and the overall setup at the front end lower level of a trailer which may be desirable at that particular position, in particular structures of trailers.
Figure 17:
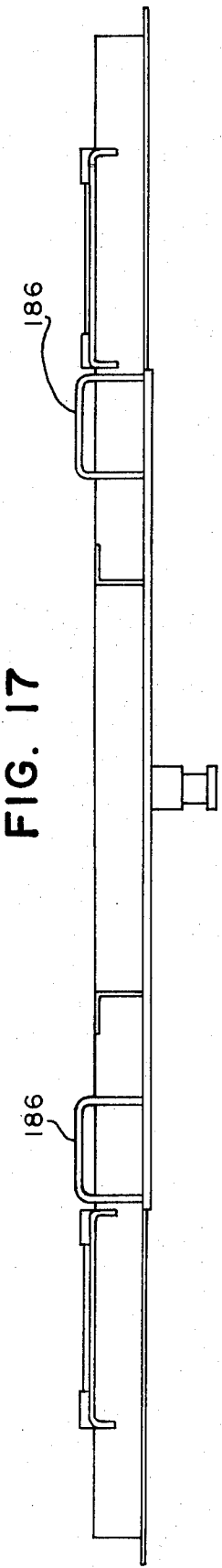
FIG. 17 is a diagrammatic cross sectional view of FIG. 16 of the track and associated structure along the line 17—17.
Figure 19:
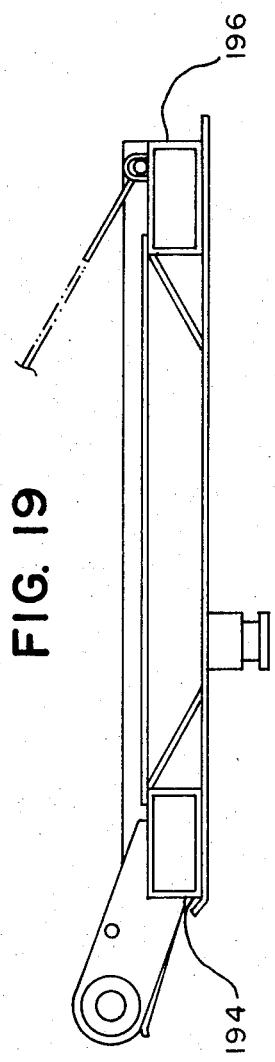
FIG. 19 is a diagrammatic side elevational view of the subject matter involved in FIGS. 16 through 18, from the left-hand side of FIG. 16.
Figure 18:
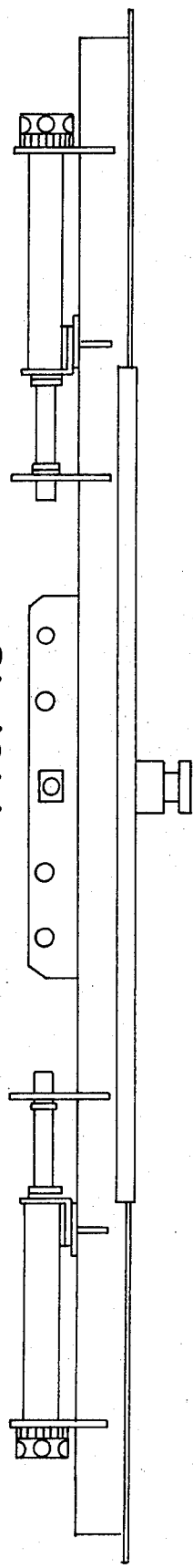
FIG. 18 is a diagrammatic end view from the front end, or in other words the winch end, of this same structure.

In this form, the permanent tracks in the trailer end not too far from position 180 on either side, and this particular structure is forward of that. Forward of that as more or less a prolongation of the track on each side is movable jumper member 182, pivotable around axis 184. To the inner side of that in each case is special member 186 which is an inverted U-shape in cross section and has on its top surface a series of holes including narrow longitudinal slots 188, the type already described, shown only at the ends of the top surface of the special member, but actually extending throughout its length on that top surface. At the very front are rachetted winches 190. Special members 186 are mounted especially on tubular cross members 194 and 196, extending across below near the front and rear respectively of this whole section 198 that is involved, and suitable additional mounting structure as best shown in FIGS. 19 and 16 is likewise employed. As will be noted, special member 186 has its top substantially above the top of tubular members 194 and 196 but the upright portions of the inverted U extend below, 186 being cut out or otherwise constructed to afford this particular construction, and the whole joined together in some suitable fashion, as for example by welding.

Figure 20:
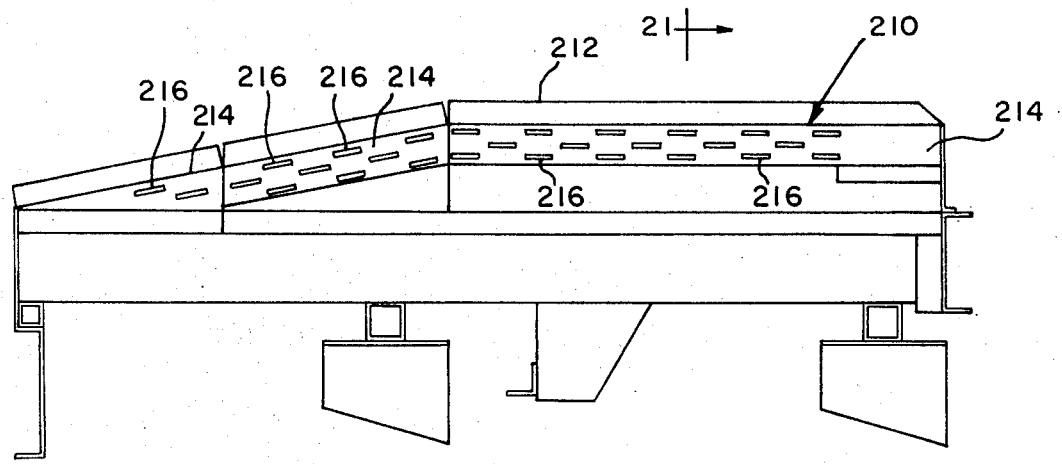
FIG. 20 is a view showing special structure desirable at the lower rear track in certain such main vehicles. This is a diagrammatic elevation from the outside.
Figure 21:
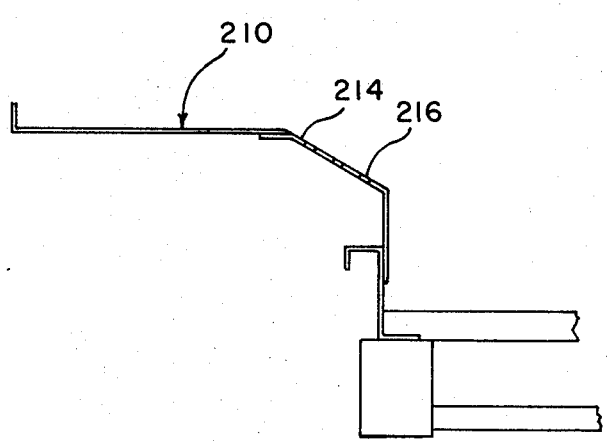
FIG. 21 is a sectional view along the line 21—21 on FIG. 20.

There is also, in the preferred form of trailer involved in the invention, a special setup in the rear lower area of the trailer as shown in FIG. 20. In this case, track 210 goes upward and then downward to make a hump at 212 in the track to enable the track as a whole to be relatively low down, yet permit proper clearance at this point relative to the rear wheels, which may in some but not necessarily all cases be the only wheels, of the trailer. In this area of the hump to the inside of each of the two elements of the track, there is provided plate 214 starting at a level with the track and sloping downward at an angle toward the inside. In this plate will be provided a series of holes 216 along the same lines as the holes elsewhere used for tie-down purposes, that is with at least one level of the hole being in narrow-crosswise form relative to its longitudinal length. The angle and width of the plate will be such that the holes will enable the idler to function at a level below the top of the hump of the track, and this may for example involve an angle of 30° with suitable width.

When a car is desired to be tied down, the asymmetrical hook of the idler can be inserted at an appropriate place in the hole provided in that area with the hook elements passing through the longitudinal slot when in a longitudinal direction, and then the hook turned to a crosswise direction below the slot. The winch can then be pulled taut and one section of the chain will then extend more or less longitudinally or nearly so to the winch, and the other section more or less longitudinally or nearly so to the point of fastening. Having been pulled up taut by the winch, the chain itself will hold the hook securely in crosswise position by its construction which prevents substantial turning from any horizontal right angle relation by the hook and upper hole.

At the same time, with its flared hole or flared pulley element, and its ability to pivot around both axes in the horizontal plane in the case of its preferred form, the idler setup can accommodate considerable angular variation in the precise direction of the chain either in the section extending to the winch or the section extending to the frame of the car, without danger of binding as a result of the angle or of being unable to come to a fully taut position.

In use for tie-down purposes, the present invention can function with great flexibility and excellent tie-down security and at the same time involves great simplicity and little addition to the permanent structure of the main vehicle that would otherwise be necessary for other purposes in the absence of this tie-down setup.

Specifically, the idler can be located effectively at practically any point along the whole track, as may best suit the particular overall setup. Thus, for example, depending on what was best thought to suit the particular situation, the overall tie-down setup can be as in FIG. 2 with the idlers beyond the ends of the wheels and the pull on the frame coming in the direction in general toward the ends of the car or the tie-down setup can be as found in FIG. 3 with the idlers next to each other under the center of the car and the pull on the frame coming in general from the central direction.

Furthermore, in the front lower area of the trailer, the forward idlers can if desired be located forward of the permanent track, in an overall setup giving a great strength and a flexibility to the whole situation, and a pull at a relatively flat angle from the horizontal, thus easily satisfying the normal requirement that the pull on the frame of the car be no more than 45° from the horizontal and if desired all the way to as low as 30° from the horizontal, but at any rate the same angle at both front and rear, at least on a given side of a given vehicle being carried.

This flexible and effective setup nevertheless requires a minimum of change to the permanent structure of the main vehicle, the hole setup being located in effect as part of the overall track setup, yet without itself in any way changing the track surface in any undesirable way. Furthermore, the idler when not in use will as a result of the double pivoting feature on the preferred form as well as its low profile, lie on the track surface without any interference with the use of that track surface by cars or other vehicles in loading or unloading.

In addition to the usefulness of this setup in tying down the vehicles being carried when the main vehicle is carrying vehicles, the overall setup involved also is highly convenient when the main vehicle is partly or wholly empty. In such case, the setup involved, as shown for example in FIG. 5, serves as a built-in storage plate, since the member at the end of the chain for attaching to the vehicle for tie-down purposes can be put in a slot as at 220, and the asymmetrical T-hook of the idler can be put in another slot as at 222, and the winch used to draw the chain up sufficiently taut to hold it in that position.

In addition to the advantage already mentioned over the form of FIGS. 14, 15, the preferred forms of idlers in FIGS. 6 and 7 and 8 and 9 have the advantage over all the other forms of the capability of having substantially smaller distance between asymmetrical T head and large ring, thus enabling the large ring to be positioned at a lower place relative to the track and other permanent structure of the tractor-trailer and insuring a good vertical component to the tie-down pull of the chain on the vehicle being transported.

When in the claims, the word "flexible member" is used, it is intended to include any member that from the overall standpoint can extend from the winch, through the idler and from there extend in a different direction to the vehicle securing means, — including a chain or a cable as the most frequently used examples.

When in the claims the term "elongated hole" is used, there is meant a hole whose total cross-sectional dimension in its most constricted area is greater in one particular direction than in the direction perpendicular to that.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described our invention, what I claim as new and desire to secure by Letters Patent is:

1. A motor-vehicle-carrying trailer having a frame and a track mounted on the frame and a portion of the track toward the rear of the trailer at a higher level than the rest of the track, a plate mounted on this higher portion of the track and extending slopingly downward in an inward direction from that mounting, walls forming elongated holes in the plate, a winch mounted on the trailer, a flexible member adapted to be pulled by the winch and having a fastening means to fasten it to a motor vehicle being carried by the trailer at the other end of the flexible member, and means riding on the flexible member at a point intermediate between the point of attachment to the winch and the fastening means and having a hook adapted to fit into an elongated hole in the plate at a time when the flexible member and its fastening means are not attached to a vehicle, and to be held crosswise of that elongated hole without capability of turning from that crosswise position at a time when the fastening means is attached to a vehicle and the flexible member has been drawn tight by the winch.

* * * * *

PO-1050
(5/69)

UNITED STATES PATENT OFFICE
CERTIFICATE OF CORRECTION

Patent No. 3,853,347     Dated December 10, 1974

Inventor(s) Billy E. Harold

It is certified that error appears in the above-identified patent and that said Letters Patent are hereby corrected as shown below:

Title page, line 73, the assignee should be listed as Bethlehem Fabricators, Incorporated.

Signed and sealed this 20th day of May 1975.

(SEAL)
Attest:

RUTH C. MASON
Attesting Officer

C. MARSHALL DANN
Commissioner of Patents
and Trademarks